United States Patent
Ishikawa et al.

[11] Patent Number: 6,061,479
[45] Date of Patent: May 9, 2000

[54] IMAGE READER APPARATUS

[75] Inventors: Yoshiro Ishikawa; Takashi Katsuki; Michio Miura; Satoshi Ueda; Ippei Sawaki; Fumitaka Abe, all of Kawasaki, Japan

[73] Assignee: Fujitsu Limited, Kanagawa, Japan

[21] Appl. No.: 08/998,995

[22] Filed: Dec. 29, 1997

[30] Foreign Application Priority Data

Aug. 13, 1997 [JP] Japan ................................. 9-218715

[51] Int. Cl.[7] .............................. G06K 7/00; G06K 9/20; H04N 1/71; H04N 1/024
[52] U.S. Cl. ...................... 382/312; 382/140; 382/313; 382/318; 358/471; 358/473; 358/474
[58] Field of Search .................................. 382/139, 140, 382/312, 313, 318; 358/471, 473, 474

[56] References Cited

U.S. PATENT DOCUMENTS

| | | |
|---|---|---|
| 4,899,228 | 2/1990 | Sano et al. ............................... 382/313 |
| 4,901,164 | 2/1990 | Kurosawa ................................ 382/313 |
| 4,969,054 | 11/1990 | Tsunji et al. ............................ 382/313 |
| 5,136,151 | 8/1992 | Kobayashi .............................. 382/313 |
| 5,182,450 | 1/1993 | Pan ........................................ 250/234 |
| 5,355,146 | 10/1994 | Chiu et al. ............................... 382/313 |
| 5,595,445 | 1/1997 | Bobry ..................................... 382/313 |
| 5,661,571 | 8/1997 | Ijuin et al. al. ......................... 358/471 |
| 5,723,859 | 3/1998 | Kerschner ............................... 250/234 |
| 5,754,713 | 5/1998 | Deguchi et al. ........................ 382/313 |

*Primary Examiner*—Phuoc Tran
*Assistant Examiner*—Daniel G. Mariam
*Attorney, Agent, or Firm*—Armstrong, Westerman, Hattori, McClelland, McLeland & Naughton

[57] ABSTRACT

An image reader apparatus includes an illuminating element to illuminate a document face to be read, an optical element to form an image of the document face illuminated by the illuminating element, an image sensor to photoelectrically convert the image formed by light passing through the optical element, and a running roller rotating in contact with the document face, wherein a horizontal distance between a document contact portion of the running roller where the running roller contacts the document and a center of imaging of the optical element is shorter than or equal to 10 mm.

18 Claims, 13 Drawing Sheets

IMAGE READER APPARATUS

CROSS-REFERENCE TO RELATED APPLICATION

This application is related to Japanese application No. HEI 9(1997)-218715, filed on Aug. 13, 1997, whose priority is claimed under 35 USC § 119, the disclosure of which is incorporated by reference in its entirety.

BACKGROUND OF THE INVENTION

1. Field of the Invention

The present invention relates to an image reader apparatus, particularly to a small-sized image reader apparatus, e.g., an image scanner, which is capable of taking characters, figures or the like on a document into an information processing apparatus such as a personal computer or a word-processor by manual scanning.

2. Description of Related Art

A conventional hand-scanning image scanner is manually moved on a document such as a newspaper, a book, a magazine, a postcard, a visiting card or the like to read an image thereon.

The image scanner is mainly composed of a light source to illuminate a document, an optical device to form an image of the document to be read, an image sensor to convert the formed image into quantity of electricity, a running roller for smoothly moving a housing of the image scanner on the document and an encoder to detect a rotation angle of the running roller.

Light emitted by the light source linearly illuminates the document through a transparent reading window provided on the housing of the image scanner at a position facing the document. Light reflected from the document passes through the reading window again and is then directed to the optical device to form an image on the image sensor composed of a number of photoelectric converting elements arranged in a row. Data of the image converted to quantity of electricity by the image sensor is then transmitted to an information processing apparatus such as a personal computer, a word-processor or the like. When the image scanner is moved on the document, the amount of movement of the image scanner is detected as the amount of rotation of the running roller. Every time when this amount of movement reaches a value predetermined from a density of scanning, the image data converted to the quantity of electricity is transmitted sequentially.

Here, as the optical device, conventionally used are those of a reduction optical system employing a single pair of lenses as shown in FIG. 12 and those if a contact optical system employing a rod lens array composed of a plurality of microlenses as shown in FIG. 13.

When a document is read by the hand-scanning image scanner, a distance between the optical device and the document may sometimes change because of unintentional movement of a user's hand in operating the image scanner, which movement may move the image scanner away from the document; because of curves of the sheets when opened to expose the page, in the case where the document is a page of bound sheets of paper like a book; and because of wrinkles of the document. In order to cope with such change of the distance between the optical device and the document, most conventional hand-scanning image scanners employ optical devices of the reduction optical system, which have deep depth of focus.

However, since the image scanner having the optical device of the reduction optical system forms a reduced image of the document by the single pair of lenses, the distance between the document and the image sensor is long and the image scanner needs a relatively large housing. Therefore the image scanner of this type has problems in portability and operability. Especially the position of the document is remote from a reading portion of the image scanner, i.e., a center of imaging of the optical device. Accordingly, when a side, top or bottom end part of a book or a bound document is scanned, the housing of the image scanner projects greatly out of the book or the document and it is difficult to read the page with keeping the image scanner horizontal to the document.

In the case of an image scanner having an optical device of the contact optical system, on the other hand, the housing thereof can be reduced in size since the distance between the document and the image sensor is small. However since this optical system has a small depth of focus, the contact optical system is rarely adapted to the manually operated image scanner in which the distance between the optical device and the document may change. As shown in FIG. 14, however, there is known an image scanner having a construction such that the housing of the image scanner is partially formed flat around a reading window, the document is pressed onto this flat part when being scanned so that the distance between the optical device and the document does not change. The roller for detecting the amount of movement of the image scanner is formed outside the flat part with some distance therefrom so that the roller does not prevent the contact of the document with the flat part. In this case, it is preferable that the width W of the flat part is large enough for ensuring stable operation (referring to FIG. 14, the width is about 19 mm), and therefore it is difficult to reduce the distance between the image reading portion and a document contact portion of the roller (referring to FIG. 14, the distance is about 18 mm). As a result, when scanning an side, top or bottom end part of the document, the housing of the image scanner may project out of the document as discussed in the case of the reduction optical system.

When the housing of the image scanner inclines or projects out of the document, on the document like a book, a focal length becomes off and an accurate image of the document cannot be obtained. Besides, in the case of a book, a side of the housing of the image scanner may come in touch with a bound portion of the book and the movement of the image scanner is restricted. As a result, an side end part of the document on the binding side may not be read or may be incompletely read.

Accordingly, in order to read the document completely to peripheral parts, it is necessary to change the position of the document or to change the direction of the housing of the scanner, which will make the operation much complicated. In order to ensure the complete reading of the document without letting the document contact portion of the housing out of the document or changing the position of the housing or the document during operation, the distance between the image reading portion and the document contact portion of the housing should be as short as possible.

Generally, documents read by such a hand-held image scanner include those printed on flat sheets of paper, books, newspapers and the like. Such documents typically have upper, lower, right and left margins of about 10 mm in view of performance of printing machines as well as the cutting of printed sheets.

Though sometimes no margins are provided due to illustrations or the like, important information is rarely printed in peripheral parts of sheets.

Therefore, it is preferable that the distance between the image reading portion and the document contact portion of the housing is as short as possible, but the distance may be set nearly the length of margins without any practical problems because the margins do not need to be read necessarily.

SUMMARY OF THE INVENTION

The present invention provides an image reader apparatus comprising an illuminating element to illuminate a document face to be read, an optical element to form an image of the document face illuminated by the illuminating element, an image sensor to photoelectrically convert the image formed by light passing through the optical element, and a running roller rotating in contact with the document face, wherein a horizontal distance between a document contact portion of the running roller where the running roller contacts the document and a center of imaging of the optical element is shorter than or equal to 10 mm.

BRIEF DESCRIPTION OF THE DRAWINGS

FIG. 8(*b*) is a schematic view illustrating a bottom surface of an image reader apparatus in accordance with Example 4 of the present invention;

DESCRIPTION OF THE PREFERRED EMBODIMENTS

Figure 1:
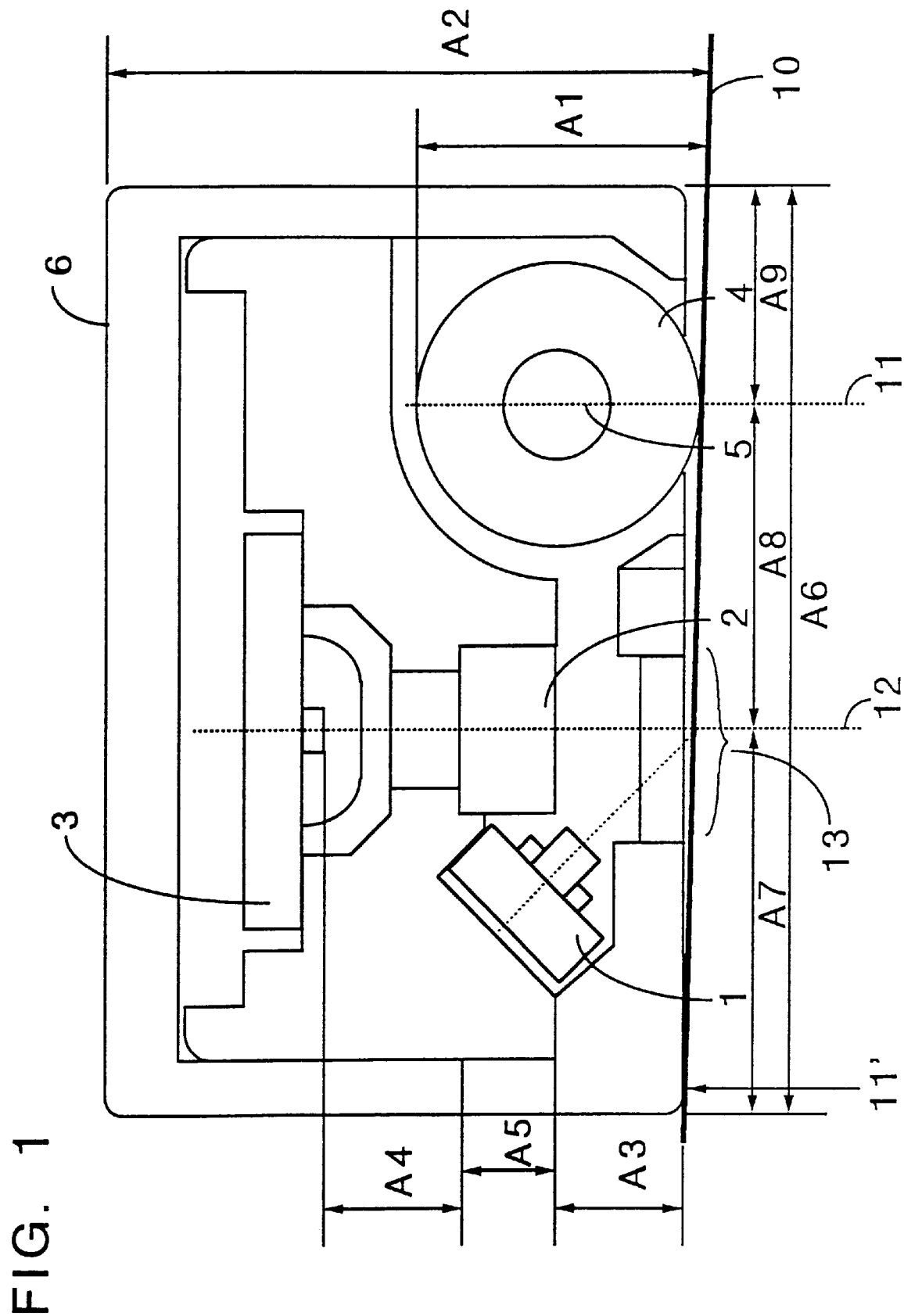
FIG. 1 is a sectional view illustrating the construction of an image reader apparatus in accordance with Example 1 of the present invention.

In another aspect, the present invention provides an image reader apparatus comprising an image sensor including a plurality of photoelectrically converting elements arranged in an array, a lens array to form an image of a document face to be read onto the image sensor, a light source to illuminate the document face, and a running roller rotating in contact with the document face in a main direction of scanning, wherein the image sensor and the lens array are placed in a housing opposedly in a direction vertical to the main direction of scanning, the light source and the running roller are placed in the housing so as to sandwich the lens array in the main direction of scanning, and a distance between a center of imaging of the lens array and a side wall of the housing adjacent to the light source is shorter than or equal to an average size for a margin on a binding side of a page of a book-form document in the case where the page is to be read by the image reader apparatus.

In still another aspect, the present invention provides a hand-held image reader apparatus for reading a page of a book by use of an image sensor of a contact optical system, wherein the image sensor of the contact optical system is placed in a housing so as to closely contact a page to be read, and a distance between a center of reading of the image sensor and at least one side wall of the housing in a secondary direction of scanning is shorter than or equal to an average size of a margin on a binding side of the page.

The inventors of the present invention have found that, by reducing the distance between the image reading portion and the document contact portion of the housing to about 10 mm or less, it is possible to suppress the change of the distance between the optical device and the document within a practically acceptable extent, without contacting portions of the housing adjacent to the reading window with the document.

The present invention has been made in view of the above to provide an image reading device capable of reading a document to every peripheral part with maintaining good operability.

According to the present invention, the illuminating element is a light source emitting visible light and is placed so as to illuminate a document positioned under the image reader apparatus.

The optical element may be one of the contact optical system, for example, as disclosed in Japanese Unexamined Patent Publication No. Hei 8(1996)-79447 (U.S. Pat. No. 5,648,874). The optical element is generally constructed to have a plurality of microlenses arranged in an array. Optical axes passing almost the center of the lenses define a center line of imaging. A place where this center line intersects with the document face is referred to as a center of imaging. This intersection is also an image reading position of the document face to be imaged by the optical element.

The image sensor is composed of several hundred of light detecting elements arranged in a row in a direction perpendicular to a direction of movement of the image reader apparatus, i.e., a direction of scanning.

The running roller is so fitted to the image reader apparatus to partially project from a bottom surface of the housing. The running roller serves to smoothly move the image reader apparatus in contact with the document surface.

The running roller is formed in a cylindrical shape longitudinally extending in a direction perpendicular to the direction of movement. The surface thereof is usually covered with an elastic material such as a neoprene rubber. A shaft is passed through the center of the cylindrical roller. The cylindrical roller rotates about the shaft.

A portion of the running roller which contacts the document face is referred to as a document contact portion of the roller. A portion of the running roller is the center of the line perpendicular to the direction of movement with a definite width.

The distance between the document contact portion of the roller and the center of imaging of the optical element (the image reading position of the document face to be imaged by the optical element) is preferably shorter than or equal to 10 mm, which corresponds to an average size of margins of documents, in order to realize high quality reading by suppressing change of the distance between the optical element and the document. As a result, the image reader apparatus can read every end part of the document such as a newspaper or a book.

Preferably, the optical axes of the lenses composing the optical element is positioned between the running roller and the illuminating element.

Further, it is preferable that the distance between the center of imaging of the optical element (the image reading position of the document face to be imaged by the optical element) and at least one side wall of the image reader apparatus in the direction perpendicular to the direction of movement is shorter than or equal to a predetermined value, for example, the above-mentioned 10 mm.

In addition to the above-mentioned document contact portion of the running roller, a projection may be provided at the bottom of the image reader apparatus to contact the document face. The projection is preferably positioned oppositely to the running roller with respect to the optical axes of the lenses composing the optical element.

Alternatively, an auxiliary roller may be provided oppositely to the running roller with respect to the optical axes of the lenses composing the optical element. The distance between a document contact portion of this auxiliary roller and the center of imaging of the optical element may be shorter than or equal to 10 mm .

The running roller may comprise a plurality of rollers arranged in a direction perpendicular to the direction of movement of the image reader apparatus.

The image reader apparatus may be provided with a first switch for indicating the start and end of movement and may further be provided with a second switch for indicating the direction of movement. Here, the first switch may be so constructed to have the function of indicating the direction of movement also.

The present invention is now described in detail by way of examples with reference to the accompanying drawings, which should not be construed as limiting the scope of the invention.

EXAMPLE 1

FIG. 1 is a sectional view illustrating the construction of an image reader apparatus in accordance with Example 1 of the present invention.

Referring to FIG. 1, the image reader apparatus includes an LED array 1 as a light source to illuminate a document 10, a lens array 2 as an optical element to receive light reflected by the document and form an erect image onto an image sensor 3, the image sensor 3 to convert the formed image to quantity of electricity, a running roller 4 for smooth movement on the document, a rotary encoder 7 (see FIG. 2) to detect a rotation angle of the running roller 4 to generate a reference signal for the timing of reading the image, and a shaft 5 as a member of a transmitting mechanism for transmitting the rotation of the running roller 4 to the rotary encoder 7.

Here as the lens array 2, an optical device of the contact optical system is preferably used for down-sizing the image reader apparatus. With the optical device of the contact optical system, the height of the lens array, $a_5$, can be reduced to about 1.8 mm.

The distance $a_3$ from the lens array 2 to the document face and the distance $a_4$ from the lowermost part of the image sensor 3 to the uppermost part of the lens array 2 may be about 2.6 mm to 2.7 mm each.

Letting the diameter $a_1$ of the running roller 4 be about 5.4 mm and that of the rotary encoder 7 about 8 mm, it is possible that the height $a_2$ of a housing 6 of the image reader apparatus is about 10 mm. Further if all elements are arranged as shown in FIG. 1, the width $a_6$ of the housing 6 in a rectangular-prism shape can be about 17 mm.

Referring to FIG. 1, a portion of the running roller 4 which contacts the document, i.e., a document contact portion of the running roller 4, is referred to as a first document contact portion 11 of the housing, and a portion of the housing which contacts the document is referred to as a second document contact portion 11'. The center of imaging which is an intersection of the optical axis of the lens array 2 with the document face, i.e., the image reading position, is referred to as a reading site 12. The second document contact portion 11' is equal or near to the left side wall of the housing. The distance from the reading site 12 to the left side wall of the housing is almost equal to the distance from the reading site 12 to the second document contact portion 11'.

The lens array 2 is composed of microlenses aligned at the same pitch in a row in the direction perpendicular to the direction of movement of the housing, i.e., the main direction of scanning. Referring to FIG. 1, this direction is a direction perpendicular to the sheet.

For example, in the case where the lens array 2 is composed of lenses in a row, the reading site 12 exists on a line extending from the center of the lenses.

Distances from the reading site 12 to the first and the second document contact portions 11 and 11', $a_8$ and $a_7$, respectively, are desired to be as short as possible, particularly equal to or shorter than the above-discussed 10 mm that corresponds with the typical size of margins of documents. For this purpose, the LED array 1 is preferably positioned oppositely to the running roller 4 with respect to the lens array 2.

The LED array 1, the lens array 2 and the image sensor 3 can be attached to walls of the formed housing (shadowed in FIG. 1) by an adhesive or the like.

Here, the distance $a_7$ between the reading site 12 and the second document contact portion 11' can be set to about 7 mm, the distance $a_8$ between the reading site 12 and the first contact portion 11 to about 6 mm, and a distance $a_9$ between the first document contact portion 11 and the right side wall of the housing to about 4 mm.

Thus, the distances $a_8$ and $a_7$ can be set shorter than 10 mm. As a result, the change of the distance between the lens array 2 and the document in manual operation can be suppressed to such a degree as does not matter practically. When reading a general document such as a book or a newspaper which has margins of about 10 mm or more, the running roller 4 does not project out of the document and the image reader apparatus can read the document in every corner.

Additionally, referring to FIG. 1, the width of the lens array may be about 3 mm. The running roller 4 may project about 0.4 mm downward from the housing. The diameter of the shaft 5 may be about 2 mm. A reading window 13 to let light through for reading the document may be about 4 mm in width.

Figure 2:
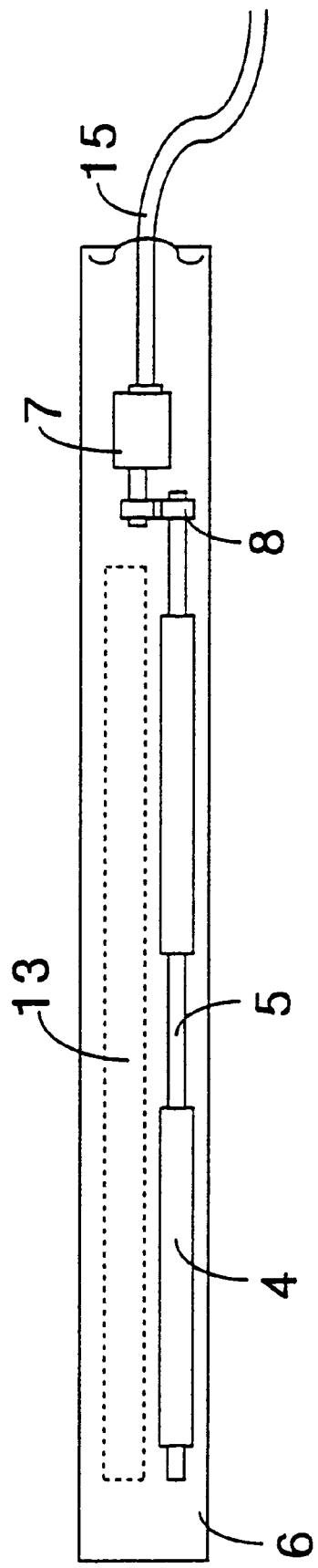
FIG. 2 is a schematic view illustrating a rotation mechanism in accordance with the present invention.

FIG. 2 is a schematic view illustrating a rotation mechanism in accordance with the present invention.

Referring to FIG. 2, the housing 6 is viewed from the bottom and a bottom cover is removed for revealing the mechanism. Dotted lines show the position of the reading window 13 provided on the bottom cover. The reading window 13 is so positioned to be farther from the right end of the housing than from the left end of the housing in FIG. 2. That is, there is a large space in the right end part of the housing. The rotation mechanism is placed in this large space.

Two running rollers 4 and a gear 8 are connected by the shaft 5. The gear 8 is engaged with another gear directly connected to the rotary encoder 7.

When the image reader apparatus scans, i.e., moves, on the document, the running rollers 4 rotate. The amount of rotation of the running rollers, which corresponds to the amount of movement, is transmitted to the rotary encoder 7 by the shaft 5 and the gear 8.

The rotary encoder 7 is mainly composed of a rotary plate having a plenty of minute slits, a light emitting element and a light receiving element. Light detected by the light receiving element is converted into an electric signal. The electric signal is transmitted to an information processing apparatus such as a personal computer by a cable 15.

Though not shown in the figure, image data obtained by the image sensor 3 is also transmitted to the personal computer or the like by the cable 15.

Although FIG. 2 shows the example in which the running roller 4 is divided into two rollers, the number of running rollers is not limited thereto. The running roller may be a one-piece roller or may be divided into three or more rollers.

Figure 3:
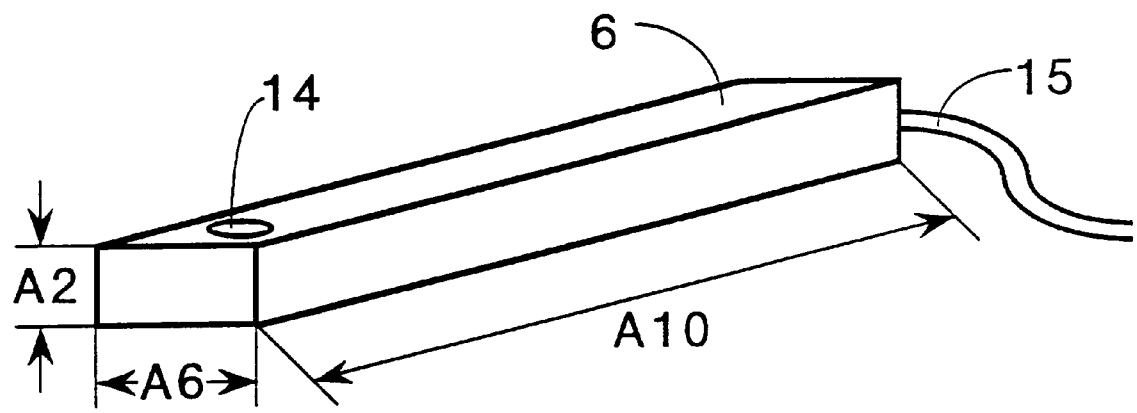
FIG. 3 is a schematic view illustrating the external appearance of an image reader apparatus in accordance with the present invention.

FIG. 3 illustrates the external appearance of the image reader apparatus in accordance with the present invention.

Referring to FIG. 3, the running roller 4 exists on the bottom surface which is not seen. A user holds the housing 6 by the hand and scans the document face in a right-left direction, a direction represented by an arrow $a_6$, to read the document. The height $a_2$ and the width $a_6$ of the housing are the same as shown in FIG. 1. The length $a_{10}$ may be varied depending on the size of a document to be read.

For example, in the case where the image reader apparatus is used for reading a relatively small document such as a post card, $a_{10}$ may be about 170 mm. In the case where the image reading device is used for reading a document of A4 size (about 210 mm in width), $a_{10}$ may be about 270 mm.

A switch 14 may be provided on the housing 6 in a position opposite to where the cable comes out of the housing as shown in FIG. 3.

The switch 14 serves to indicate the start and end of scanning to the personal computer or the like. A signal generated by switching the switch 14 to ON or OFF is transmitted to the personal computer or the like by the cable 15. The switch 14 is referred to as a "scanning start/end indicating switch."

As discussed above, in the example shown in FIG. 1, since the distance $a_8$ between the reading site 12 and the first document contact portion 11 is as short as 6 mm (<10 mm), every corner of a general document such as a newspaper which has peripheral margins of only about 10 mm can be easily read by a one-direction scanning. Further, even in the case where the document to be read is a thick book which forms a curve when opened, the image reader apparatus can be kept in stable contact with the document face because the distance $a_8$ is small and, as a result, the document can be clearly read.

Further, the distance $a_8$ between the reading site 12 and the first document contact portion 11 can be as short as about 4 mm in view of the size of the components such as a roller, strength of the housing and stable running property of the image reader apparatus. In other words, the above-mentioned distance $a_8$ is preferably longer than or equal to 4 mm and shorter than or equal to 10 mm.

Further, as shown in FIG. 1, the distance $a_7$ between the second document contact portion 11' and the reading site 12 is set as small as 7 mm (<10 mm). Therefore, even in the case where the image reader apparatus scans a page of a bound book leftward in FIG. 1, a smooth scanning can be performed without losing focus. Even if the left side wall of the housing in FIG. 1 touches bound part of the book, an accurate image of characters and/or figures in the left side part of the book can be obtained.

EXAMPLE 2

Figure 4:
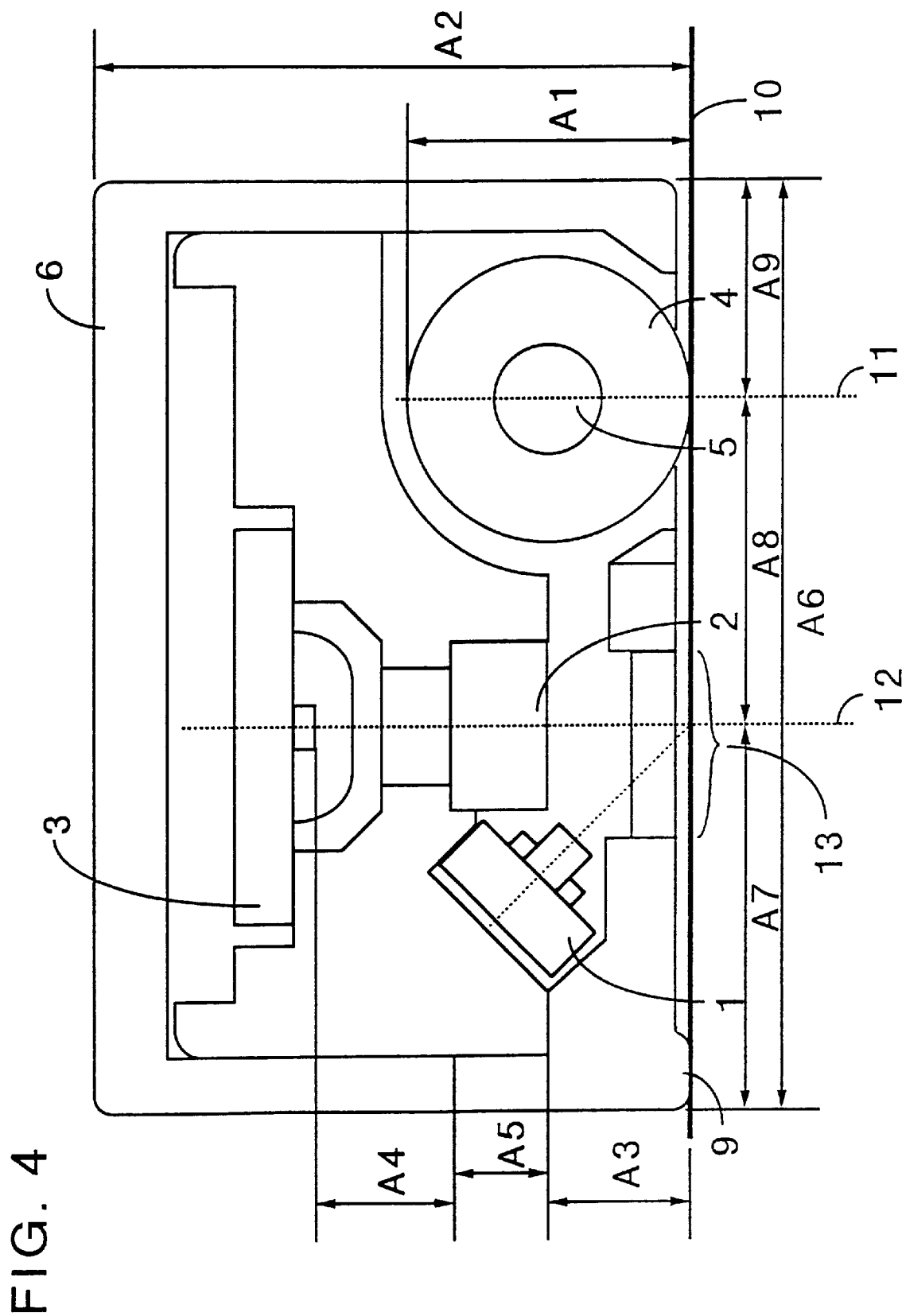
FIG. 4 is a sectional view illustrating the construction of an image reader apparatus in accordance with Example 2 of the present invention.

FIG. 4 is a sectional view illustrating the construction of an image reader apparatus in accordance with Example 2 of the present invention.

Referring to FIG. 4, this example is different from Example 1 in that a projection 9 is provided in the left-bottom part of the housing which is opposite to the running roller 4 with respect to the reading site 12.

Without such a projection, the left-bottom part of the housing directly contacts the document, and an area where the left-bottom part contacts the document face varies depending on the amount of force applied to the housing 6 in scanning. As a result, frictional force changes and therefore the scanning may become unstable. Also, the distance between the lens array 2 and the document possibly changes to some extent. With the projection, on the other hand, the document contacts the housing by the projection 9 and the first contact portion 11 of the running roller 4. This enables stable operability and constancy in distance between the lens array 2 and the document.

Figure 5:
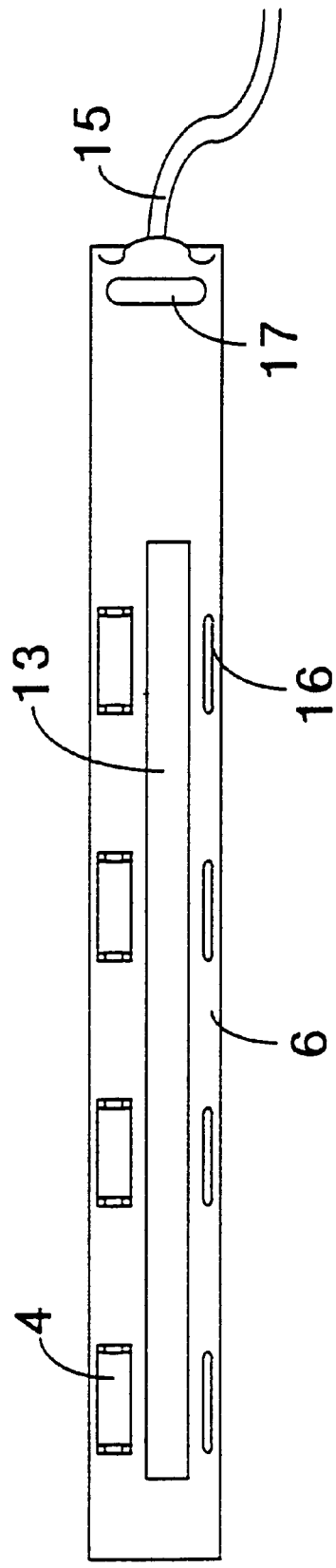
FIG. 5 is a schematic view illustrating a bottom surface of an image reader apparatus in accordance with Example 2 of the present invention.

FIG. 5 is a schematic view of the bottom surface of the image reader apparatus of Examiner 2.

Referring to FIG. 5, the image reader apparatus includes four running rollers 4 and four projections 16 as well as a projection 17 in an end part in the longitudinal direction.

The height of the projections 16 and 17 is preferably almost the same as the height of the part of the running roller 4 that projects from the housing, i.e., about 0.4 mm.

The projection 16 is positioned opposedly to the running roller 4 with respect to the reading window 13. However the position of the projection 16 is not limited to that shown in FIG. 5. Also the number of the projections 16 is not limited to four. The projection 16 may be one elongated projection or may comprises five or more projections.

The projection 17 serves to prevent the image reading device to be inclined in the longitudinal direction.

The running roller 4 and the projection 16 keep the housing up from the document face. Therefore the reading window 13, which is typically made of a transparent plastic material such as an acrylic resin, does not touch or rub against the document face. As a result the reading window 13 is protected from scratches.

In the example shown in FIG. 5, the running roller includes four rollers spaced properly, but the running roller 4 may be an elongated one-piece roller.

However, since the running roller is usually made of an elastic material such as a neoprene rubber, it may be difficult to put the shaft through the elongated thin roller.

Therefore, it facilitates the assembly of the device to use two or more shorter rollers through which the shaft is put as shown in the figure. In this case, however, intervals between the rollers should be determined properly in order that even a small-sized document can be read without the inclination of the housing 6.

In FIG. 5, for example, each of the running rollers 4 is preferably about 10 mm in length and the interval between the running rollers is preferably about 20 mm in the case where the reading window 13 is about 110 mm in length. With such a construction, a small-sized document such as a visiting card can be fully read.

Figure 6:
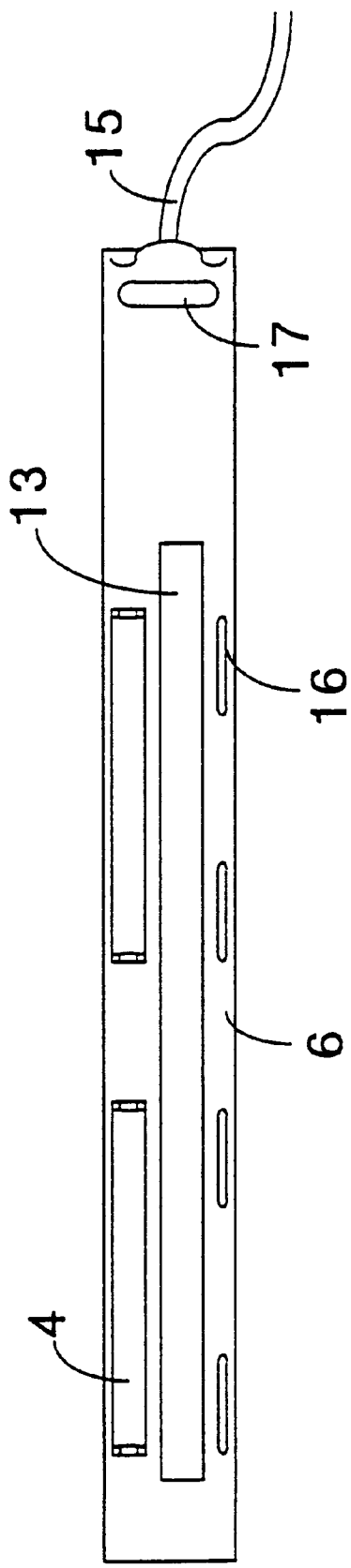
FIG. 6 is a schematic view illustrating a bottom surface of an image reader apparatus provided with two running rollers in accordance with Example 2 of the present invention.

FIG. 6 is a schematic view of the bottom surface of an image reader apparatus provided with two running rollers 4. In this case, each of the running rollers 4 is preferably about 40 mm in length and the interval between the running rollers is preferably about 20 mm.

EXAMPLE 3

Figure 7:
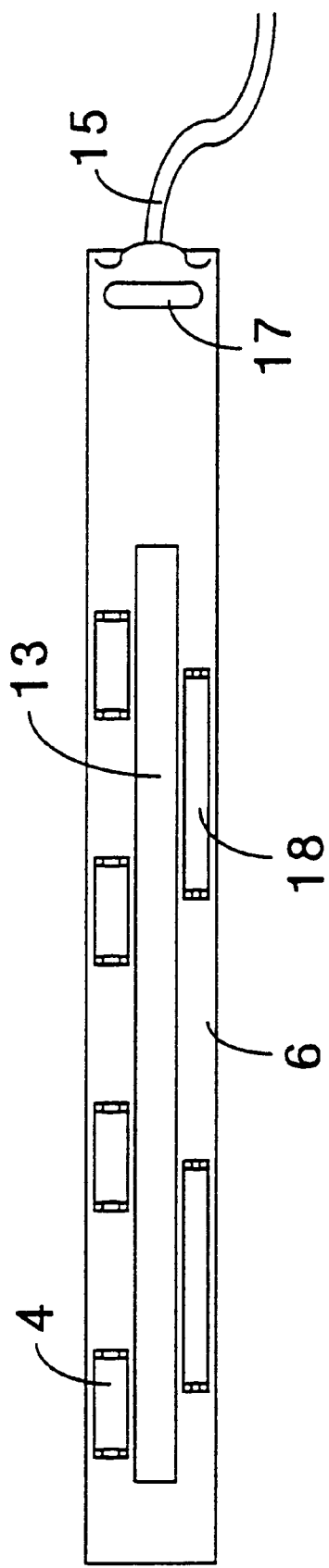
FIG. 7 is a schematic view illustrating a bottom surface of an image reader apparatus provided with an auxiliary roller in accordance with Example 3 of the present invention.

FIG. 7 is a schematic view of a bottom surface of an image reader apparatus in accordance with Example 3.

This example is different from Example 2 in that an auxiliary roller 18 is provided in place of the projections 16.

The auxiliary roller 18 may preferably be placed opposedly to the running roller 4 with respect to the reading site 12, for example. In this case, it is also possible to scan smoothly in both directions without the inclination of the housing.

The number of the auxiliary roller 18 is not limited to two as shown in FIG. 7, but the auxiliary roller 18 can take any position and any number that allows the housing to be kept level.

Accordingly, the auxiliary roller 18 may be a one-piece roller elongated in the longitudinal direction or may comprise three or more rollers of nearly the same length as the running roller 4 which are provided in an opposed relation to the running roller 4 with respect to the reading section 12.

Another auxiliary roller may further be provided in place of the projection 17.

EXAMPLE 4

The examples shown in FIGS. 5, 6 and 7 show arrangements of the elements for the case where the switch 14 is positioned in the left-end portion of the housing 6 as shown in FIG. 3.

For this construction, it is necessary to leave a certain space (about 10 mm in length) for the switch and the wiring thereof between the left end of the housing 6 and the left end of the reading window 13.

When the image reader apparatus reads a newspaper, this construction may do. However, when reading a page of a book, the housing touches the bound part of the page. Accordingly, it is preferable that the switch 14 is mounted in another position and the left end of the reading window 13 is brought nearer to the left end of the housing 6.

Figure 8:
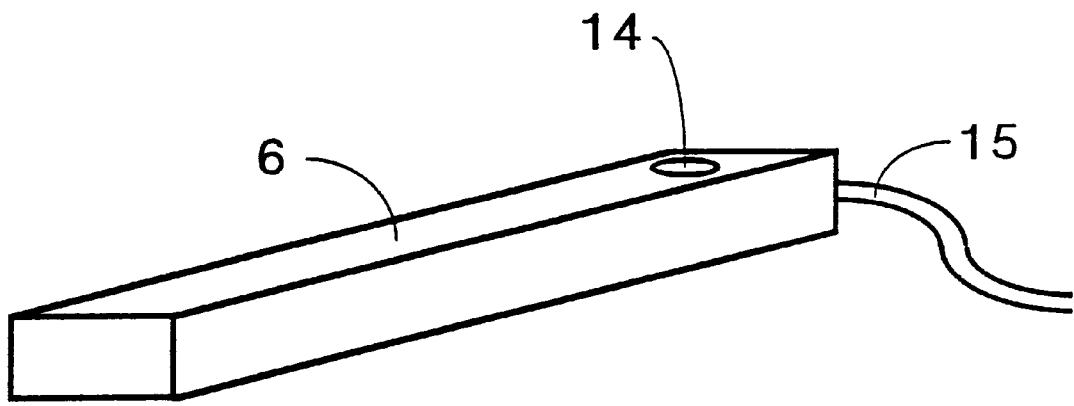
FIG. 8(*a*) is a schematic view illustrating the external appearance of an image reader apparatus in accordance with Example 4 of the present invention.
Figure 8:
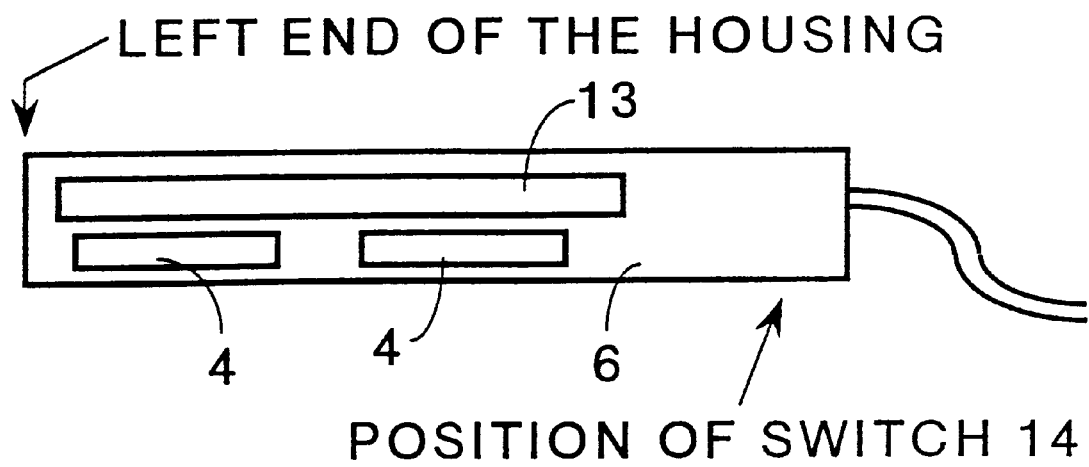

For this purpose, the switch 14 may be mounted in the part where the cable is connected, as shown in FIGS. 8(*a*) and 8(*b*). With this construction, the reading window 13 can be extended closer to the left end of the housing 6, and the document can be read to all peripheral parts.

Figure 9:
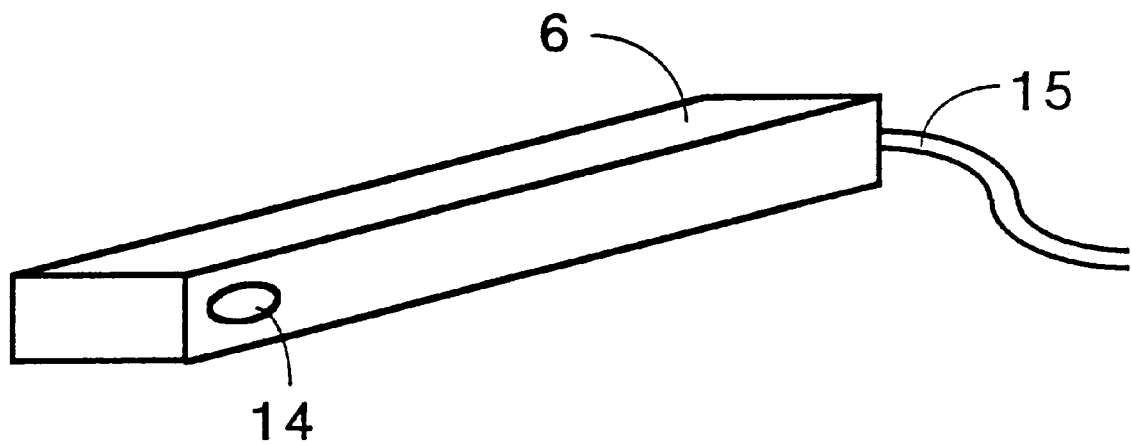
FIG. 9 is a schematic view illustrating the external appearance of an image reader apparatus showing an alternative position for a switch.

Alternatively, as shown FIG. 9, the switch 14 may be mounted on the right or left side walls of the housing 6.

In this case, since a space in proximity of the right or left side wall of the housing 6 is utilized, the height and the length of the housing can be reduced further by 2 to 3 mm and by 10 mm, respectively.

EXAMPLE 5

Here, shown is an example further including a "scanning direction indicating switch."

Conventionally, most hand-held scanner scans in only one direction.

In the case where the direction of scanning can be switched, the switching is operated by setting on a display of a personal computer to which the scanner is connected.

This switching must be manually operated separately from the manual scanning, which makes the operation troublesome.

In this example, however, the "scanning direction indicating switch" is mounted on the housing for switching the direction of scanning in addition to the "scanning start/end indicating switch" 14.

The two switches may be arranged in a row on the top surface or the right or left side wall in the end portion of the housing 6 where the cable is connected. For clear distinction of the two switches, the two switches are preferably different in shape or appearance. Both the switches may be push switches capable of switching to ON/OFF.

Figure 10:
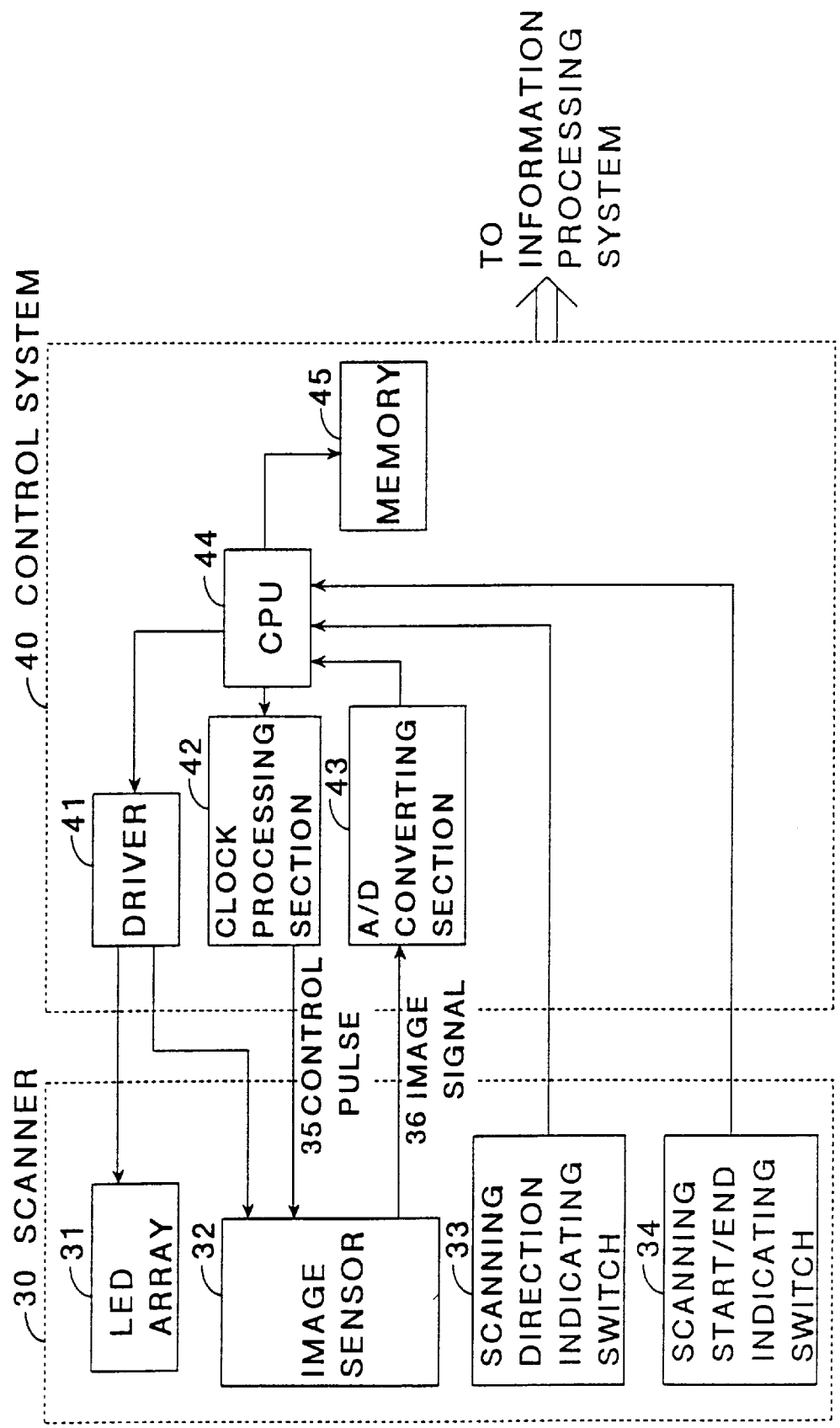
FIG. 10 is a block diagram explaining the construction of a control block in accordance with Example 5 of the present invention.

FIG. 10 is a block diagram illustrating a control block in accordance with Example 5 of the present invention.

FIG. 10 shows only components related to the control which are provided in a housing 6 of a scanner 30. Here, the scanner 30 is characterized by having a "scanning direction indicating switch" 33 and a "scanning start/end indicating switch" 34. Signals inputted by the switches 33 and 34 are transmitted to a CPU 44 of a control system.

The control system 40 may be provided within the housing 6 or outside the housing 6 with a cable for connection. The control system 40 is mainly composed of the CPU 44, a memory 45, a driver 41, a clock processing section 42 and an A/D converting section 43.

The driver 41 controls ON/OFF of a power source of an LED array 31 and provides a signal to start reading to an image sensor 32.

The clock processing section 42 provides a control pulse 35 for the timing of reading to the image sensor 32. Image data obtained by the image sensor 32 is A/D-converted by the A/D converting section 43 and stored in the memory 45 through the CPU 44.

The scanning start/end indicating switch 34 generates a trigger signal to indicate the start or end of the reading of a document. For example, when this switch 34 is pushed, the CPU 44 receives the generated trigger signal, recognizes it as a scanning start signal and outputs a signal to drive the driver 41.

The scanning direction indicating switch 33, for example, may generate a control signal indicating that the scanning is performed to the right in FIG. 1 when this switch is not pushed and a control signal indicating that the scanning is performed to the left in FIG. 1 when this switch is pushed.

On receiving either of the control signals, the CPU 44 recognizes in which scanning direction an inputted image signal is obtained.

Thus, with the scanning direction indicating switch 33 mounted to the housing 6, the switching of scanning direction does not need to be operated on a personal computer separate from the housing 6 but can be manually operated on the housing 6. Therefore the operability of the image reader apparatus is much improved.

FIG. 10 shows the example including the two switches 33 and 34. However the functions of these two switches may be carried out by one switch. If one switch indicates both the "scanning start/end" and the "switching of scanning direction," it is possible to reduce the number of components, downsize the housing and reduce costs.

In order that the two functions of the switches 33 and 34 are carried out by one switch, modes may be switched by a software.

The switching of modes can be fulfilled by counting the number of the pushings of the switch from the start of reading and measuring the period of time for which the switch is being pushed.

Figure 11:
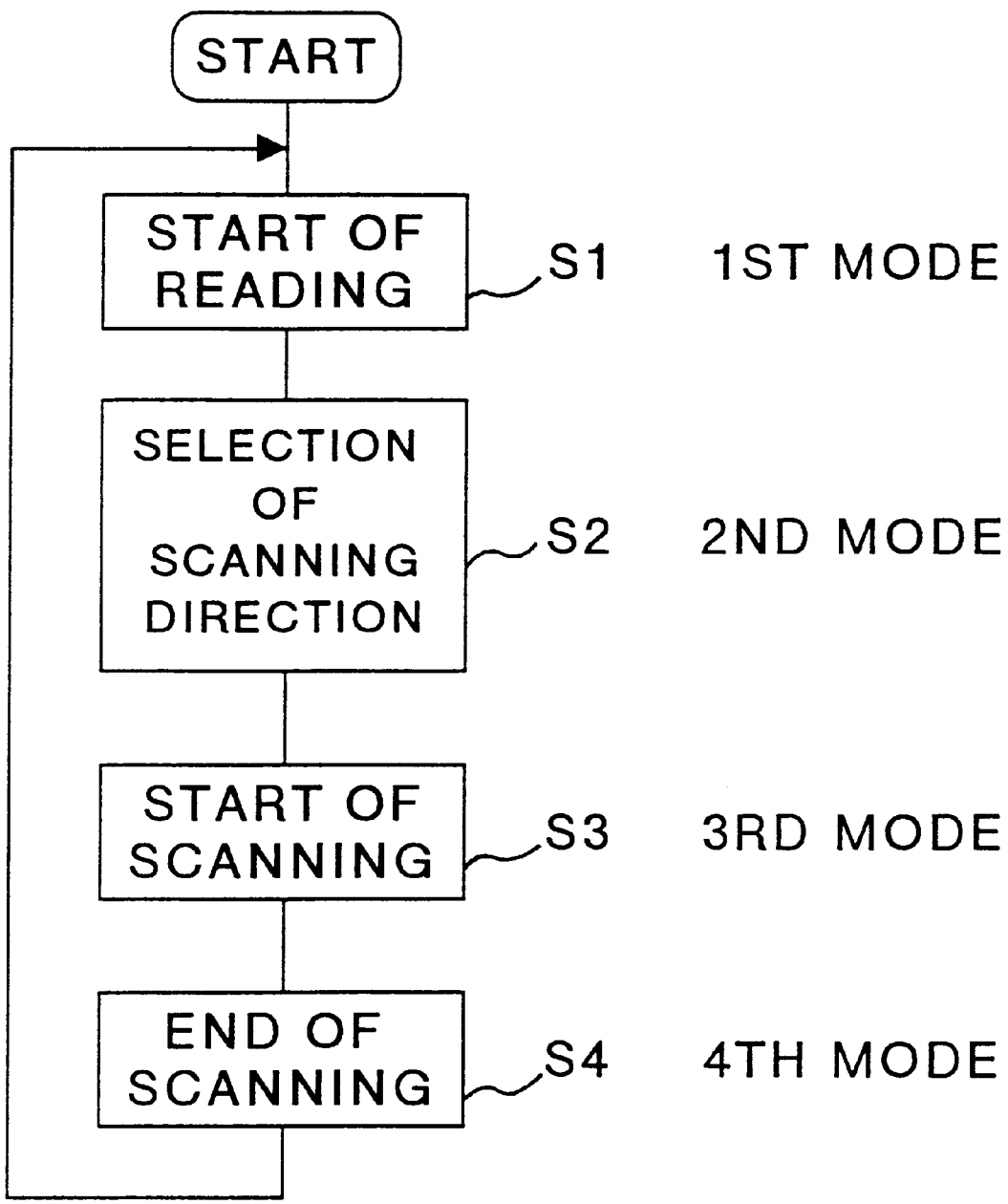
FIG. 11 is a flowchart explaining the switching of modes in accordance with the present invention.
Figure 12:
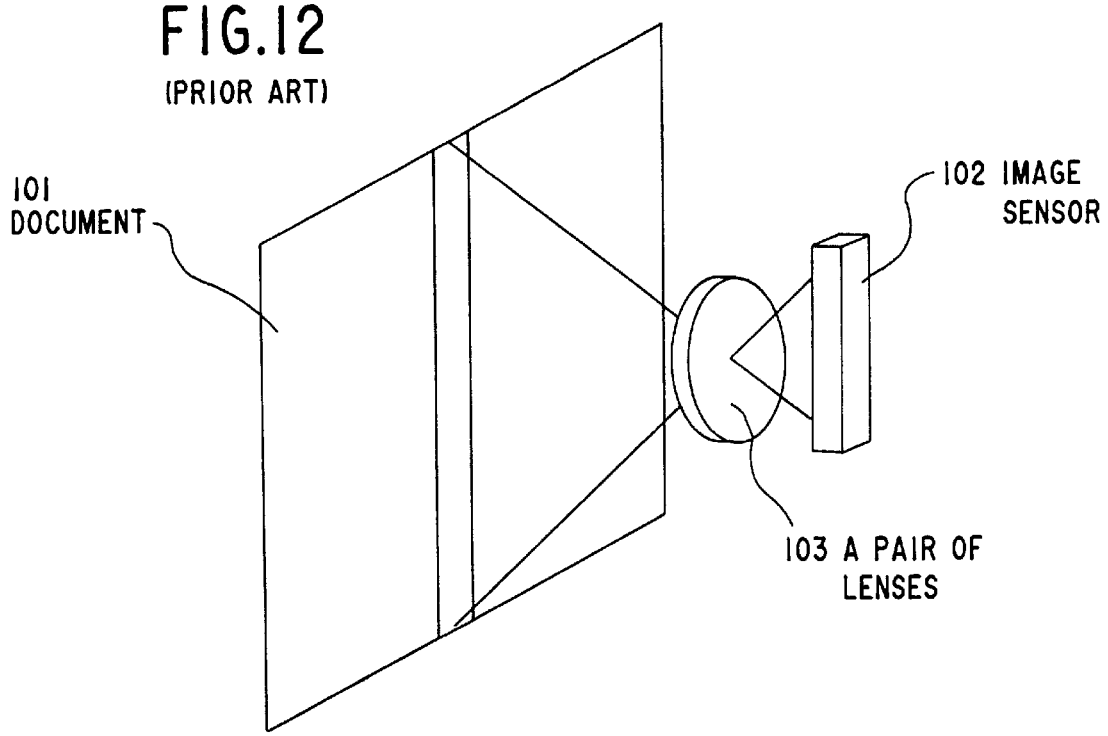
FIG. 12 is a schematic view illustrating the construction of a conventional reduction optical system.
Figure 13:
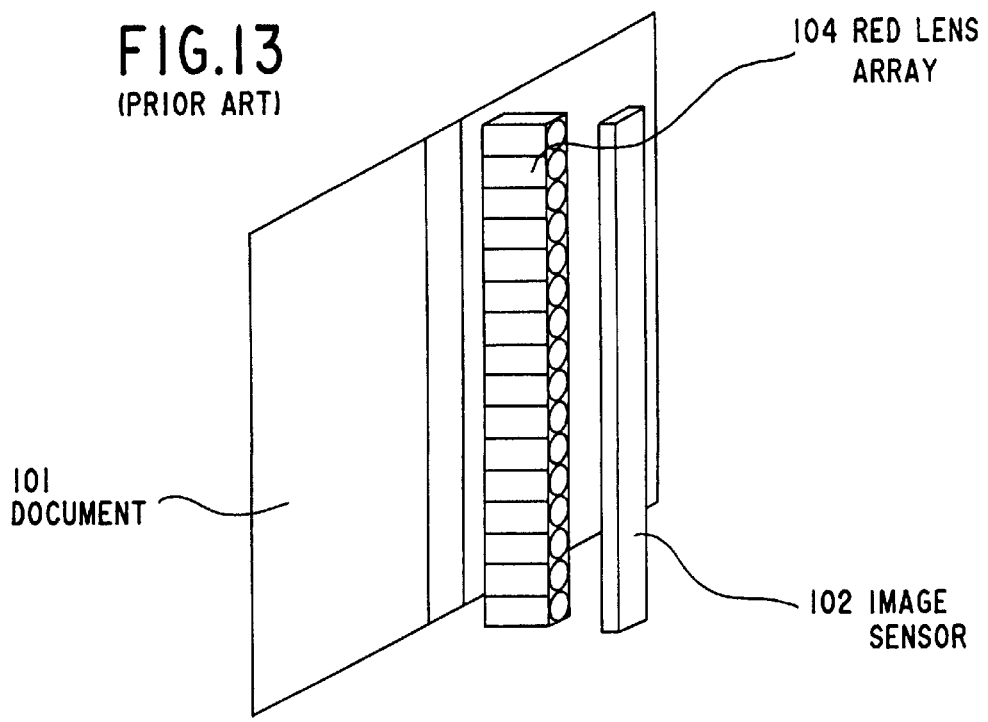
FIG. 13 is a schematic view illustrating the construction of a conventional contact optical system.
Figure 14:
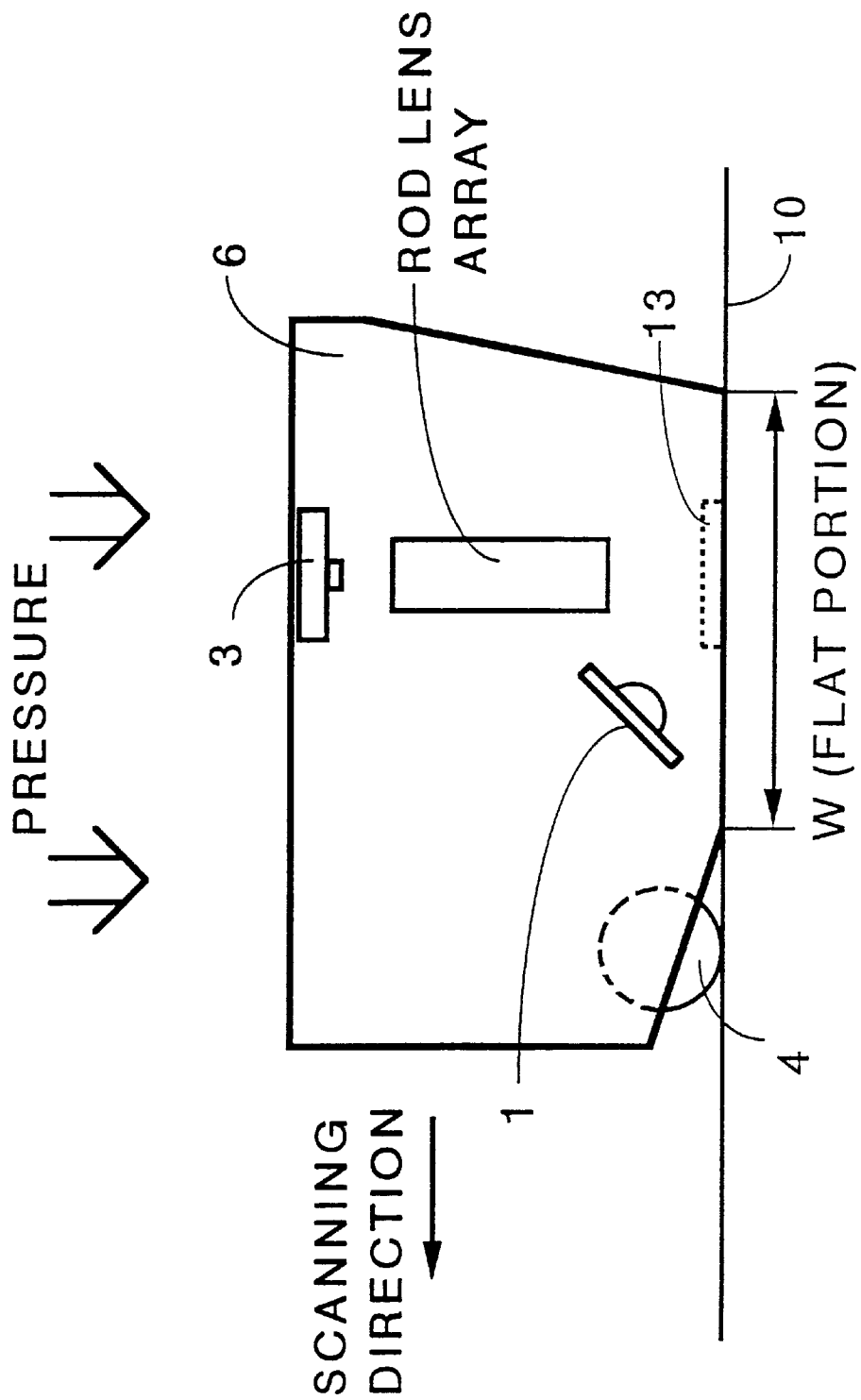
FIG. 14 is a schematic view illustrating the construction of a document contact portion of a conventional image scanner employing the contact optical system.

FIG. 11 shows an exemplary flowchart explaining the switching of modes.

This example has four modes which are sequentially switched at every input by the switch. The CPU carries out the control with checking input signals form the switch. The switching of modes is now explained about a scanner having only one switch 34.

First, in Step S1 wherein the mode is a first mode, the CPU waits for a switch input indicating the start of reading.

In this mode state, if the switch 34 is pushed, the CPU judges that the reading is started and proceeds to the next Step S2.

In Step S2 wherein the mode is a second mode, the CPU waits for a switch input indicating the scanning direction.

For example, if the switch 34 is pushed within a predetermined time period (e.g., five seconds) after the switching to the second mode, the CPU judges that the scanning is done rightward, and if the switch 34 is not pushed within that time period, the CPU judges that the scanning is done leftward. After the predetermined time period has passed, the CPU proceeds to Step S3.

In Step S3, wherein the mode is changed to a third mode, the CPU waits for a switch input indicating the "start of scanning."

In this state, if the switch 34 is pushed, the CPU judges that the scanning is started, performs initialization necessary for image data to be inputted, and proceeds to step S4.

Here, the switch input meaning the "start of scanning" may be one push operation, but may also be other predetermined operation such as a so-called double click.

Then, in Step 4, which is in a fourth mode, the CPU waits for a switch input meaning the "end of scanning."

If the CPU receives the switch input meaning the "end of scanning", the CPU judges that the scanning is ended and switches the mode to the first mode.

By following the above-explained flow, the switching of scanning directions and the start/end of scanning are able to be inputted by only one switch.

However, the above flow is only an example and should not be construed as being limitative. The number of switch inputs, the waiting time, the order of modes and the like can be changed as occasion demands.

According to the present invention, the distance from the document contact portion of the running roller of the image reader apparatus to the center of imaging of the optical device (i.e., the image reading position of the document face to be imaged by the optical device) is shorter than or equal to a size (10 mm) corresponding with the average margin size of documents. Accordingly, the change of the distance between the optical device and the document can be suppressed to a practically negligible degree even when the document is curving like an opened book. Thus the present invention provides a stable image reading. The invention has also achieved the improvement of the operability of the image reader apparatus and the complete reading of a document in every corner without slip of the document contact portion from the document face while downsizing the device.

The present invention provides a stable image reading of even a peripheral part of a page when the document to be read is of book form, because the distance from the center of imaging of the lens array to the light source side wall of the housing is shorter than or equal to the average margin size on the binding side of the document.

What is claimed is:

1. An image reader apparatus comprising:
   an illuminating element to illuminate a document face to be read;
   an optical element to form an image of the document face illuminated by the illuminating element;
   an image sensor to photoelectrically convert the image formed by light passing through the optical element; and
   a running roller rotating in contact with the document face,
   wherein a horizontal distance between a document contact portion of the running roller where the running roller contacts the document and a center of imaging of the optical element is shorter than or equal to 10 mm, and
   a distance between the center of imaging of the optical element and at least one side wall of the image reader apparatus in a direction perpendicular to a direction of movement of the image reader apparatus is shorter than or equal to 10 mm.

2. The image reader apparatus according to claim 1, wherein the optical element comprises a plurality of lenses, optical axes of the lenses is positioned between the running roller and the illuminating element.

3. The image reader apparatus according to claim 1 or 2, wherein the image reader apparatus contact the document face at the document contact portion of the running roller and at a projection provided at a bottom surface of the image reader apparatus.

4. The image reader apparatus according to claim 1 wherein the image reader apparatus contact the document face at the document contact portion of the running roller and at a projection provided at a bottom surface of the image reader apparatus.

5. The image reader apparatus according to claim 3 wherein the projection is provided opposedly to the running roller with respect to the optical axes of the lenses of the optical element.

6. The image reader apparatus according to claim 4 wherein the projection is provided opposedly to the running roller with respect to the optical axes of the lenses of the optical element.

7. The image reader apparatus according to any one of claims 1 or 2 further comprising an auxiliary roller provided opposedly to the running roller with respect to the optical axes of the lenses.

8. The image reader apparatus according to any one of claim 1 or 2 further comprising an auxiliary roller provided opposedly to the running roller with respect to the optical axes of the lenses.

9. The image reader apparatus according to claim 7 wherein a distance between a document contact portion of the auxiliary roller which contacts the document face and the center of imaging of the optical element is shorter than or equal to 10 mm.

10. The image reader apparatus according to claim 8 wherein a distance between a document contact portion of the auxiliary roller which contacts the document face and the center of imaging of the optical element is shorter than or equal to 10 mm.

11. The image reader apparatus according to claim 1 wherein the running roller comprises a plurality of rollers arranged on a bottom surface of the image reader apparatus in a direction perpendicular to a direction of movement of the image reader apparatus.

12. The image reader apparatus according to claim 1 further comprising a first switch to indicate a start and end of movement.

13. The image reader apparatus according to claim 12 wherein the first switch has the function of indicating a direction of movement.

14. The image reader apparatus according to claim 12 further comprising a second switch to indicate a direction of movement.

15. An image reader apparatus comprising:
- an image sensor including a plurality of photoelectrically converting elements arranged in an array;
- a lens array to form an image of a document face to be read onto the image sensor;
- a light source to illuminate the document face; and
- a running roller rotating in contact with the document face in a main direction of scanning, wherein the image sensor and the lens array are placed in a housing in an opposed relation to a direction vertical to the main direction of scanning, the light source and the running roller are placed in the housing so as to sandwich the lens array in the main direction of scanning, and a distance between the center of imaging of the lens array and a side wall of the housing adjacent to the light source is shorter than or equal to 10 mm.

16. The image reader apparatus according to claim 15 wherein a distance between the center of imaging of the lens array and a document contact portion of the running roller which contacts the document face is shorter than or equal to 10 mm.

17. The image reader apparatus according to claim 15 or 16 wherein the housing is a rectangular prism longer in length than the lens array, the lens array is placed in the housing so that one end of the lens array is in close proximity of one end in a longitudinal direction of the housing, and a rotary encoder is placed in a space defined in the other end portion of the housing, the rotary encoder generating a signal corresponding to an amount of movement in the main direction of scanning in association with the running roller.

18. A hand-held image reader apparatus for reading a page of a book by use of an image sensor of a contact optical system, wherein the image sensor of the contact optical system is placed in a housing so at to closely contact a page to be read, and a distance between a center of reading of the image sensor and at least one side wall of the housing in a secondary direction of scanning is shorter than or equal to 10 mm.

\* \* \* \* \*